(12) United States Patent
Couch et al.

(10) Patent No.: US 8,691,081 B2
(45) Date of Patent: Apr. 8, 2014

(54) PROCESS FOR CONTACTING HYDROCARBON FEED AND CATALYST

(75) Inventors: Keith A. Couch, Arlington Heights, IL (US); Paolo Palmas, Des Plaines, IL (US); Jason P. Lambin, New Lenox, IL (US); Giovanni Spinelli, Lake in the Hills, IL (US)

(73) Assignee: UOP LLC, Des Plaines, IL (US)

(*) Notice: Subject to any disclaimer, the term of this patent is extended or adjusted under 35 U.S.C. 154(b) by 1246 days.

(21) Appl. No.: 12/556,052

(22) Filed: Sep. 9, 2009

(65) Prior Publication Data
US 2011/0056871 A1  Mar. 10, 2011

(51) Int. Cl.
*C10G 11/00* (2006.01)

(52) U.S. Cl.
USPC ............................ 208/113; 208/125; 208/128

(58) Field of Classification Search
USPC ................................................. 208/113–130
See application file for complete search history.

(56) References Cited

U.S. PATENT DOCUMENTS

| | | | |
|---|---|---|---|
| 2,948,671 A | 8/1960 | Packle et al. | |
| 3,785,962 A | 1/1974 | Conner et al. | |
| 3,888,762 A | 6/1975 | Gerhold | |
| 4,414,098 A * | 11/1983 | Zandona et al. | 208/120.1 |
| 4,717,467 A * | 1/1988 | Haddad et al. | 208/113 |
| 4,800,014 A * | 1/1989 | Hays et al. | 208/157 |
| 5,338,438 A | 8/1994 | Demoulin et al. | |
| 5,430,222 A | 7/1995 | Fersing et al. | |
| 5,554,341 A | 9/1996 | Wells et al. | |
| 5,858,207 A | 1/1999 | Lomas | |
| 6,894,183 B2 | 5/2005 | Choudhary et al. | |
| 6,916,416 B2 | 7/2005 | Adamson et al. | |
| 2008/0081006 A1 | 4/2008 | Myers et al. | |

FOREIGN PATENT DOCUMENTS

WO WO 9605909 A1 2/1996
WO WO 2005/080531 A1 9/2005

* cited by examiner

*Primary Examiner* — Brian McCaig
(74) *Attorney, Agent, or Firm* — James C Paschall

(57) ABSTRACT

A process for distributing a deflecting media into an axial center of a riser to push catalyst outwardly toward the feed injectors ensures better contacting between hydrocarbon feed and catalyst.

19 Claims, 2 Drawing Sheets

PROCESS FOR CONTACTING HYDROCARBON FEED AND CATALYST

BACKGROUND OF THE INVENTION

The invention relates to a process for mixing hydrocarbon feed and catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

FCC units are being designed increasingly larger because refiners are trying to capitalize on economies of scale. As the reactor riser of FCC units are designed with correspondingly increasing diameter, the distance between the wall mounted feed injectors and the axial center of the riser increases. As FCC reactor risers become larger, care must be taken to ensure hydrocarbon feed and catalyst are adequately contacted. Inadequate contact between catalyst and hydrocarbon feed can result in substantially higher dry gas and coke formation and reduced conversion of hydrocarbon feed, all undesirable performance attributes.

Improved apparatuses and processes are sought for the contacting of catalyst and hydrocarbon feed in larger FCC units.

SUMMARY OF THE INVENTION

We have found that in larger FCC units, hydrocarbon feed from the feed injectors does not penetrate through the flowing catalyst to the center of the riser. Consequently, a high density core of catalyst can develop in the riser which is not impacted by injected feed. The high density core can be very stable and exist while ascending through a significant height of the riser resulting in lack of conversion and poorer selectivity to desirable products.

An embodiment of our process for contacting catalyst with a hydrocarbon feed comprises distributing a lift gas to a riser to lift the catalyst upwardly in a reactor riser. A deflecting media is distributed into an axial center of the riser to deflect catalyst away from a center of the riser. Hydrocarbon feed is injected into the riser and hydrocarbon feed is contacted with catalyst in the reactor riser to crack the hydrocarbon feed to produce lighter gaseous hydrocarbons.

An embodiment of our apparatus for contacting catalyst with a hydrocarbon feed comprises a riser in which the hydrocarbon feed is contacted with catalyst particles to catalytically crack hydrocarbons in the hydrocarbon feed to produce a gaseous product of lighter hydrocarbons and carbonized catalyst. A lift gas distributor distributes lift gas to the riser. A deflecting media distributor distributes deflecting media to the riser and the deflecting media distributor has a nozzle aligned with the axial center of the riser. A feed injector injects hydrocarbon feed into the riser. The feed injector is above at least one of the lift gas distributor and the deflecting media distributor.

DETAILED DESCRIPTION OF THE INVENTION

The process of the present invention is for contacting catalyst with a hydrocarbon feed. The present invention may be useful in any solids-gas contacting equipment. However, ready usefulness is found in an FCC unit.

Figure 1:
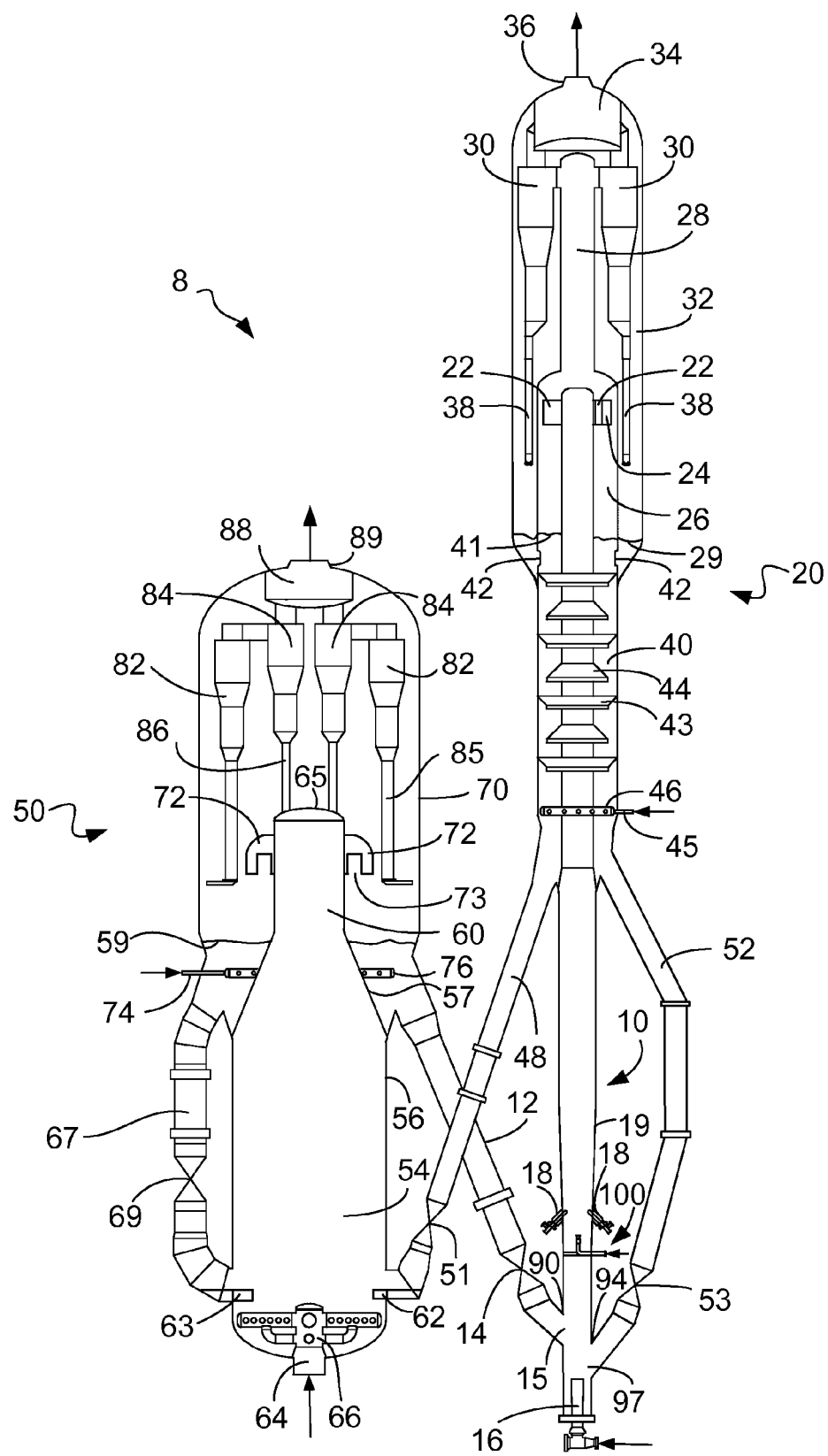
FIG. 1 is a schematic, elevational view of an FCC unit incorporating the present invention.

FIG. 1 shows an FCC unit 8 that includes a reactor vessel 20 and a regenerator vessel 50. A regenerator catalyst conduit 12 transfers regenerated catalyst from the regenerator vessel 50 at a rate regulated by a control valve 14 to a reactor riser 10 through a regenerated catalyst inlet 15. The regenerated catalyst conduit 12 intersects the reactor riser 10 at a regenerated catalyst conduit intersection 90, which is the highest point at which the regenerated catalyst conduit intersects the riser 10. A lift gas distributor 16 distributes lift gas to the riser 10. The lift gas is typically steam, but other light hydrocarbons or hydrogen may be used. The lift gas urges a stream of catalyst upwardly through the riser 10 at a relatively high density traveling at least at 3 meters/second (10 feet/second).

A plurality of feed injectors 18 inject feed across the flowing stream of catalyst particles to distribute hydrocarbon feed to the riser 10. The feed injectors 18 may be circumferentially located on a frustum 19 of the riser. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst. The riser has an aspect ratio suitably of at least 10.

A conventional FCC feedstock and higher boiling hydrocarbon feedstock are suitable feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. As used herein, the term "communication" means that material flow is operatively permitted between enumerated components. The term "downstream communication" means that at least a portion of material flowing to the component in downstream communication may operatively flow from the component with which it communicates. The term "upstream communication" means that at least a portion of the material flowing from the component in upstream communication may operatively flow to the component with which it communicates. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 that effects partial separation of gases from the catalyst. A transport conduit 28 carries the hydrocarbon vapors, including stripped hydrocarbons, stripping media and entrained catalyst to one or more cyclones 30 in the reactor vessel 20 which separates carbonized catalyst from the hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped carbonized catalyst leaves the stripping section 40 of the disengaging vessel 26 of the reactor vessel 20 with a lower concentration of entrained or adsorbed hydrocarbons than it had when it entered or if it had not been subjected to stripping. Carbonized catalyst leaves the disengaging vessel 26 of the reactor vessel 20 through a spent catalyst conduit 48 and passes into the regenerator vessel 50 at a rate regulated by a slide valve 51. The spent catalyst conduit 48 is in downstream communication with the outlet port 24 of the riser 10. Optionally a first portion of carbonized catalyst leaves the disengaging vessel 26 through the spent catalyst conduit 48 while a second portion of the carbonized catalyst that has been coked in reactor riser 10 leaves the disengaging vessel 26 of the reactor vessel 20 and is passed through a carbonized catalyst conduit 52 back to the riser 10 at a rate regulated by a control valve 53. The optional carbonized catalyst conduit 52 is in downstream communication with the reactor vessel 20 and intersects the riser 10 at a carbonized catalyst conduit intersection 94 and defines a carbonized catalyst inlet 97 to the riser 10. The carbonized catalyst intersection 94 is the highest point at which the carbonized catalyst conduit 52 intersects the riser 10. The carbonized catalyst conduit intersection 94 is above the lift gas distributor 16 so the lift gas therefrom can lift the catalyst upwardly in the riser 10 to the feed injectors 18. The carbonized catalyst conduit 52 is in downstream communication with the outlet port 24 of the riser 10 and in upstream communication with the carbonized catalyst inlet 97 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 15 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y Zeolite is preferred, but the older style amorphous catalysts can be used if desired. Additionally, shape-selective additives such as ZSM-5 may be included in the catalyst composition to increase light olefin production.

FCC units have been designed in progressively larger sizes over the past few years because refiners are trying to capitalize more on economies of scale. As the FCC reactor risers have also been progressively designed with increased diameters, the distance between the wall mounted feed injectors and the axial center of the riser has been increasing. Recent gamma scan tomography data from a larger commercial FCC unit has shown that the feed and steam injection from feed injectors circumferentially mounted around the wall of a riser only penetrates the interior of the riser by about 0.6 meters (2 feet). As such, we have found that risers with diameters larger than 1.2 meters (4 feet) can develop a high density core of catalyst in the axial center of the riser. The high density core can be very stable and exist for a significant portion of the overall riser. This results in several performance deficiencies. The formation of a vapor annulus results in hot catalyst coring in the center of the riser and increased particle slip and backmixing at the walls. The penalties are substantially higher dry gas and coke formation, and reduced conversion of hydrocarbon feed.

In the present invention, a deflecting media distributor 100 distributes deflecting media to the riser 10 where a central axial core is expected to develop to deflect catalyst away from the center of the riser and into contact with the hydrocarbon feed. The deflecting media distributor is separate from the lift gas distributor 16 and feed injectors 18.

Figure 2:
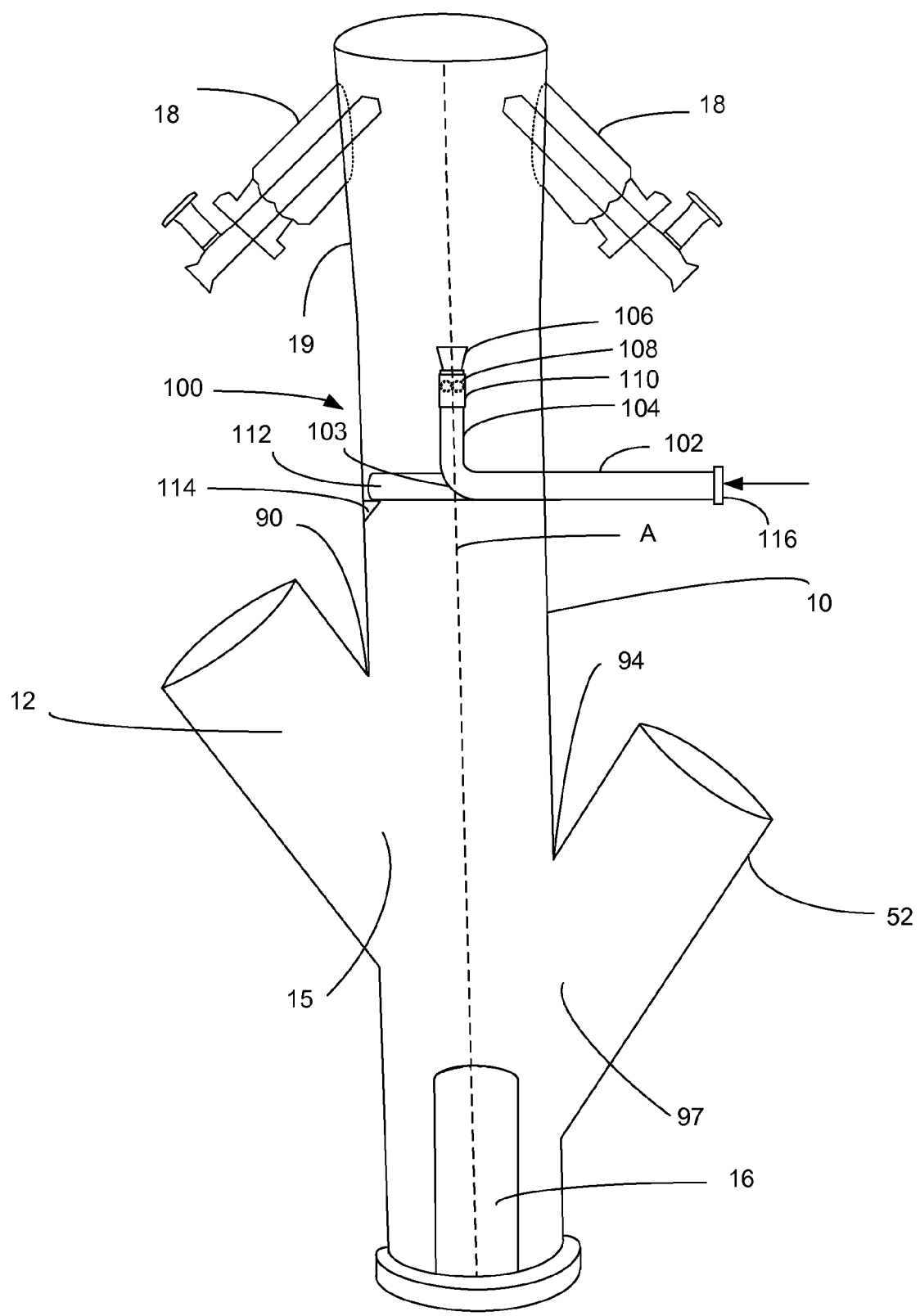
FIG. 2 is a perspective view of a lower partial section of FIG. 1.

The deflecting media distributor 100 is best shown in FIG. 2 which is a close up perspective view of the lower end of the riser 10. The deflecting media distributor 100 comprises a pipe having a horizontal segment 102 that extends into the riser 10 and a vertical segment 104 that extends vertically coincident with the axial center of the riser 10 shown by centerline "A" of the riser 10. An elbow 103 may communicate the horizontal segment 102 and the vertical segment 104. The deflecting media distributor terminates at a nozzle 106 on the top of the vertical segment 104. The nozzle 106 is aligned with the axial center on centerline A. An atomizing device 108 such as an internal swirl vane is depicted in phantom in FIG. 2 inside an enlarged portion 110 of the vertical segment 104 for shearing the deflecting media and atomizing it before it exits through nozzle 106. The nozzle 106 may be a cone with an open upper base directed to spray deflecting media upwardly into the axial core of catalyst. In an embodiment, the upper base of the cone of the nozzle 106 may be closed with openings therein. The nozzle 106 may have other suitable configurations. Split couplings (not shown) with tapered retaining rings may be used to secure together assembled components of deflecting media distributor 100. A support brace 112 such as a pipe secured such as by welding to the deflecting media distributor 100 may be supported by a shelf 114 secured to the wall on the side of the riser 10 opposite to an inlet 116 to the deflecting media distributor 100 to stabilize the deflecting media distributor 100 in the riser 10. The support brace 112 may be secured such as by welding to the shelf 114. The deflecting media distributor 100 will be subjected to severe erosion from up flowing catalyst. Hence, the deflecting media distributor 100, the support brace 112 and shelf 114 should be made of a durable material such as stellite and/or coated with a refractory like the rest of the interior wall of the riser 10.

The deflecting media may be hydrogen, dry gas, light petroleum gas (LPG), naphtha or other hydrocarbon. Steam may be used as the deflecting media. When the deflecting media enters the riser and contacts the hot catalyst it will expand. Liquid deflecting media will vaporize to a greater volume. Hydrocarbonaceous deflecting media may crack to smaller hydrocarbons thereby increasing its moles and its volume. The expanding deflecting media provides a motive force to deflect the hot catalyst from the axial core closer to the feed injectors for improved contact between the hydrocarbon feed and catalyst.

It is also contemplated that hydrocarbons be fed to the riser 10 as a hydrocarbon feed through deflecting media distributor 100. Hydrocarbon feed be may be light hydrocarbons recycled from previously cracked products from the riser 10 recovered in the fractionation recovery zone downstream of outlet 36. Naphtha and LPG may be recycled to the riser 10 to increase the yield of light olefins. In such a case, a lighter deflecting media may be mixed with the light hydrocarbon feed to act as an atomizing media. The hydrocarbon feed and the lighter atomizing media all act as deflecting media. The atomizing media may be mixed with the hydrocarbon feed within or outside of the deflecting media distributor 100. In this case, the lighter atomizing media should be gaseous even if the hydrocarbon feed is liquid or partially liquid to achieve atomization of the hydrocarbon feed. Consequently, a light hydrocarbon such as dry gas is superior to steam as an atomizing media when light hydrocarbons are the feed to the deflecting media distributor 100 because light hydrocarbon atomizing media will be less likely to condense at the lower temperature of the light hydrocarbon feed relative to the higher temperature typical of heavier hydrocarbon feed injected into the riser 10 through feed injectors 18. Dry gas used as a deflecting media and an atomizing media may be obtained from lighter gaseous hydrocarbons previously cracked in riser 10, recovered in fractionation recovery zone downstream of outlet 36 and recycled to deflecting media distributor 100.

The feed injectors 18 are suitably above one or both of the lift gas distributor 16 and the deflecting media distributor 100. The lift gas distributor 16 lifts catalyst entering from catalyst inlets 15 and 97 below the feed injectors 18 up to the feed injectors 18. The deflecting media distributor is suitably above the regenerated catalyst conduit intersection 90 and/or the carbonized catalyst conduit intersection 94 which in an aspect are between the lift gas distributor 16 and the deflecting media distributor 100. The present invention is most advantageous for risers having a diameter of at least 1.2 meters (4 feet) at the level of the hydrocarbon feed injector because the hydrocarbon feed may be injected from injectors 18 to a point short of the center of the riser shown by centerline A.

Turning back to FIG. 1, the regenerator vessel 50 is in downstream communication with the reactor vessel 20. In the regenerator vessel 50, coke is combusted from the carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 of perhaps at least 1.1 m/s (3.5 ft/s) under fast fluidized flow conditions. In an embodiment, the lower chamber 54 may have a catalyst density of from 48 to 320 kg/m$^3$ (3 to 20 lb/ft$^3$) and a superficial gas velocity of 1.1 to 2.2 m/s (3.5 to 7 ft/s). The oxygen in the combustion gas contacts the carbonized catalyst and combusts carbonaceous deposits from the catalyst to at least partially regenerate the catalyst and generate flue gas and regenerated catalyst.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The regenerator vessel 50 may also include an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposit catalyst through diplegs 85, 86 into dense catalyst bed 59. Flue gas exits the cyclones 82, 84 and collects in a plenum 88 for passage to an outlet nozzle 89 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. As such, gas is added not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas will be fed to the upper chamber 70 through fluidizing conduit 74.

From about 10 to 30 wt-% of the catalyst discharged from the lower chamber 54 is present in the gases above the outlets 73 from the riser section 60 and enter the cyclones 82, 84. The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 704° C. (1100 to 1300° F.) in the lower chamber 54 and about 649 to about 760° C. (1200 to 1400° F.) in the upper chamber 70. Regenerated catalyst from dense catalyst bed 59 is transported through regenerated catalyst conduit 12 from the regenerator vessel 50 back to the reactor riser 10. The regenerated catalyst travels through the control valve 14 and an inlet 15 provided by the regenerated catalyst conduit 12 into the riser 10 where it again contacts feed as the FCC process continues. The regenerated catalyst conduit intersection 90 is above the lift gas distributor 16 so the lift gas therefrom can lift the catalyst upwardly in the riser 10 to the feed injectors 18.

We have also found when a stream of carbonized catalyst and a stream of regenerated catalyst are both fed into the riser 10; they tend not to mix before contacting the hydrocarbon feed. Accordingly, the feed can encounter catalyst at varying temperatures resulting in non-selective cracking to a composition with relatively more undesirable products. To ensure mixing between the carbonized catalyst and the regenerated catalyst, the regenerated catalyst conduit intersection 90 is above the carbonized catalyst conduit intersection 94 and the regenerated catalyst inlet 15 is above the carbonized catalyst inlet 97. Steam can have a dealuminating effect on the zeolitic catalyst and this dealuminating effect increases proportionally with temperature. By bringing the cooler carbonized catalyst into the riser between the fluidizing gas which is typically steam from nozzle 16 and the regenerated catalyst from regenerated catalyst conduit 12, the carbonized catalyst has an opportunity to cool the regenerated catalyst before the regenerated catalyst stream encounters the steam. Consequently, the regenerated catalyst encounters the steam only at a reduced temperature at which the dealuminating effect is minimized.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for contacting catalyst with a hydrocarbon feed, said process comprising:
   distributing a lift gas to a riser to lift said catalyst upwardly in said reactor riser;
   spraying a deflecting media along an axial center of said riser below where said hydrocarbon feed is injected into said riser to deflect catalyst away from a center of the riser;
   injecting hydrocarbon feed into said riser; and
   contacting said hydrocarbon feed with said catalyst in said reactor riser to crack said hydrocarbon feed to produce lighter gaseous hydrocarbons.

2. The process of claim 1 wherein coke is deposited on the catalyst to produce carbonized catalyst in said contacting step and further comprising:
   separating said gaseous hydrocarbons from said carbonized catalyst;
   contacting at least a portion of said carbonized catalyst with oxygen to combust coke from said catalyst to produce regenerated catalyst; and
   passing said regenerated catalyst to said riser.

3. The process of claim 1 wherein said lift gas is distributed to said riser below where said deflecting media is distributed to said riser.

4. The process of claim 1 wherein said riser has a diameter of at least 1.2 meters (4 feet) at the level at which hydrocarbon feed is injected into said riser.

5. The process of claim 1 wherein said deflecting media is selected from the group comprising dry gas, LPG or naphtha.

6. The process of claim 5 wherein said deflecting media is obtained from said lighter gaseous hydrocarbons.

7. The process of claim 1 wherein said hydrocarbon feed and an atomizing media are distributed to the axial center of the riser.

8. The process of claim 1 wherein said lift gas is traveling at least at 3 meters/second (10 feet/second).

9. The process of claim 1 wherein said hydrocarbon feed is injected to a point short of the center of the riser.

10. A process for contacting catalyst with a hydrocarbon feed, said process comprising:
    distributing a lift gas to a riser to lift said catalyst upwardly in said reactor riser;
    spraying a deflecting media along an axial center of said riser below where said hydrocarbon feed is injected into said riser to deflect catalyst away from a center of the riser;
    injecting hydrocarbon feed into said riser; and
    contacting said hydrocarbon feed with said catalyst in said reactor riser to crack said hydrocarbon feed to produce lighter gaseous hydrocarbons.
    separating said gaseous hydrocarbons from said carbonized catalyst;
    contacting at least a portion of said carbonized catalyst with oxygen to combust coke from said catalyst to produce regenerated catalyst; and
    passing said regenerated catalyst to said riser.

11. The process of claim 10 wherein said hydrocarbon feed is injected to a point short of the center of the riser.

12. A process for contacting catalyst with a hydrocarbon feed, said process comprising:
   distributing a lift gas to a riser to lift said catalyst upwardly in said reactor riser;
   spraying a deflecting media comprising hydrocarbon feed and atomizing media along an axial center of said riser to deflect catalyst away from a center of the riser;
   injecting hydrocarbon feed into said riser above the distribution of the deflecting media; and
   contacting said hydrocarbon feed with said catalyst in said reactor riser to crack said hydrocarbon feed to produce lighter gaseous hydrocarbons.

13. The process of claim 12 wherein coke is deposited on the catalyst to produce carbonized catalyst in said contacting step and further comprising:
   separating said gaseous hydrocarbons from said carbonized catalyst;
   contacting at least a portion of said carbonized catalyst with oxygen to combust coke from said catalyst to produce regenerated catalyst; and
   passing said regenerated catalyst to said riser.

14. The process of claim 12 wherein said riser has a diameter of at least 1.2 meters (4 feet) at the level at which hydrocarbon feed is injected into said riser.

15. The process of claim 12 wherein said hydrocarbon feed comprising deflecting media is selected from the group comprising LPG and naphtha.

16. The process of claim 15 wherein said atomizing media comprises dry gas.

17. The process of claim 15 wherein said deflecting media is obtained from said lighter gaseous hydrocarbons.

18. The process of claim 12 wherein said deflecting media is sprayed above the distribution of the lift gas.

19. The process of claim 12 wherein said hydrocarbon feed is injected to a point short of the center of the riser.

* * * * *